US00RE43068E

(19) United States
(12) Reissued Patent
Woodard et al.

(10) Patent Number: US RE43,068 E
(45) Date of Reissued Patent: Jan. 3, 2012

(54) REAL ESTATE COORDINATION PROGRAM

(75) Inventors: Scott E. Woodard, Clarendon Hills, IL (US); Herbert A. Greenman, Palo Alto, CA (US); Victoria Richard-York, Chicago, IL (US)

(73) Assignee: Showingtime.com, Inc., Chicago, IL (US)

(21) Appl. No.: 11/999,478

(22) Filed: Dec. 4, 2007

Related U.S. Patent Documents

Reissue of:
(64) Patent No.: 6,973,432
Issued: Dec. 6, 2005
Appl. No.: 09/716,887
Filed: Nov. 20, 2000

U.S. Applications:
(60) Provisional application No. 60/166,554, filed on Nov. 19, 1999.

(51) Int. Cl.
*G06Q 90/00* (2006.01)
*G06Q 50/00* (2006.01)

(52) U.S. Cl. ..... 705/313; 705/7.12

(58) Field of Classification Search ..... 705/8, 7.12
See application file for complete search history.

(56) References Cited

U.S. PATENT DOCUMENTS 4,866,611 A * 9/1989 Cree et al. ..... 708/112
4,977,520 A 12/1990 McGaughey, III
5,124,912 A 6/1992 Hotaling
5,197,000 A 3/1993 Vincent
5,584,025 A * 12/1996 Keithley et al. ..... 707/104.1
5,664,115 A * 9/1997 Fraser ..... 705/37
5,842,009 A 11/1998 Borovoy
5,960,406 A 9/1999 Rasansky
5,974,406 A * 10/1999 Bisdikian et al. ..... 1/1
6,016,478 A 1/2000 Zhang
6,085,166 A 7/2000 Beckhardt
6,101,480 A * 8/2000 Conmy et al. ..... 705/9
6,594,633 B1 * 7/2003 Broerman ..... 705/313

OTHER PUBLICATIONS

Dunlap, David. "Listings on the Internet : An Ever-Widening Web," New York Times, Aug 20, 1995 [retrieved from Proquest].*
Archived version of www.homesdatabase.com, 1999.*
"Consumers Can Now Access More Than 80 Percent of All California Property Listings on One Web Site," PR Newswire, Nov. 12, 1996 [retrieved from Dialog].*
Archived version of www.realtor.com, 1997 [retrieved from archive.org].*

* cited by examiner

*Primary Examiner* — Beth V Boswell
*Assistant Examiner* — Neil R Kardos

(57) ABSTRACT

A process for managing the showing and usage of real estate up for sale. The process allows buyers to schedule a showing or in person viewing of real estate directly through an Internet web site. The buyer will be able to view the schedule of multiple properties in their area giving them the ability to plan their house hunting expeditions. Sellers of real estate may block out times when they do not want their property shown directly from their own computers. Agents will have complete visibility of the seller's availability time thereby increasing availability to schedule. Sellers will also be able to view when agents have scheduled a showing for their property and gain access to historical records of their property showings. Agents will be able to list properties for showings and make appointments for their clients to view other agents' properties with a click of a mouse. The central scheduling focus will be around the property. The seller's agent along with the seller will set up pre-conditions allowing a buyer or buyer's agent to select times for showings around these pre-conditions.

1 Claim, 10 Drawing Sheets

THE MIDDLE TIER CAN EITHER BE IN THE SERVER COMPUTER THAT CONTAINS THE DATABASE, OR CAN BE IN ANOTHER SERVER COMPUTER THAT COMMUNICATES OVER THE INTERNET TO THE SERVER IN THE DATABASE. THE SERVERS CAN COMMUNICATE WITH THE BROWSER USING HTML, JAVA APPLETS, DHTML, ACTIVEX OR OTHER INTELLIGENT COMPONENTS OF THE BROWSER.

FIG. 5

Schedule a showing for the week of (Sun-Sat): July 18 - July 24, 1999 ▼ HELP

| | | | |
|---|---|---|---|
| MLS Number: | 98120093 | Agent Name: | MCGEE LEN |
| Address: | 617 N Paulina | Agent Phone #: | 312-490-2418 |
| Unit: | 3N | Agent Fax #: | |
| Price: | $309,900 | Agent Cell Phone #: | |
| | | Agent Email: | |

You must enter your name, email address and phone number to have your request time submitted.

Name:

Email:

Phone:

We mandate that potential buyers provide these pieces of information.

Click the time to request or cancle a showing for the property and then select: SAVE

Note: Your showingtime is NOT confirmed until you have received an email or phone call.

White fields represent available times

| Time of day | Sunday July 18 | Monday July 19 | Tuesday July 20 | Wednesday July 21 | Thursday July 22 | Friday July 23 | Saturday July 24 |
|---|---|---|---|---|---|---|---|
| 9:00 AM | | | | | | | |
| 9:30 AM | | | | | | | |
| 10:00 AM | Requested | | | | | | |
| 10:30 AM | | | | | | | |
| 11:00 AM | | | | | | | |

REAL ESTATE COORDINATION PROGRAM

Matter enclosed in heavy brackets [ ] appears in the original patent but forms no part of this reissue specification; matter printed in italics indicates the additions made by reissue.

This is the specification and claims for a non-provisional patent application claiming priority of provisional patent application Ser. No. 60/166,554, filed Nov. 19, 1999.

FIELD OF THE INVENTION

This invention relates generally to a process for scheduling usage of a real estate property and all the parties involved in real estate transactions: the buyers, the sellers, the agent for the buyers, the agent for the sellers, and vendors such as inspectors. More particularly, this invention relates to an Internet based program for managing and tracking the timing of activities related to real estate property transactions.

BACKGROUND OF THE INVENTION

A potential seller of real estate contacts a listing agent to list the real estate property. Potential buyers may locate potential properties through Internet searches or direct communications with buyer's agents. A seller must see the property and may need professional inspection. Prior to a real estate closing the buyer may wish to make a final walk through for a final check of the conditions of the property. The current paradigm of real estate scheduling involves buyers contacting their agent, who must then contact the seller's agent who then contacts the seller. The property may be unavailable at certain times and the parties required for an activity may not be easily matched. The process may involve multiple iterations until appointments for real estate showings, inspections, and walk through can occur. This outdated method of coordinating buyers', sellers', and agents' schedules results in tedious phone tag and frustration on the part of parties not [too] *to* mention the obvious inefficiencies. There is no focus to the process of making the property available for the different activities to achieve the result of having a transaction of the property.

Accordingly, there is a need for a simpler process that keeps the listing real estate agents as the center of the online transaction, allows the buyer's agents to respond to the needs of their clients with instant showing confirmations, and enables agents to respond quickly to client demands.

SUMMARY OF THE INVENTION

As a result, a primary object of the invention is to provide a simpler process keeping the listing real estate agents as the center of the online transaction. A secondary object of the invention is to allow the buyer's agents to respond to the needs of their clients with instant showing confirmations, and enables agents to respond quickly to client demands. The present invention satisfies the stated objects of invention as well as others not stated. The present invention provides a process for managing the showing and usage of real estate up for sale. The process allows buyers to schedule a showing or in person viewing of real estate directly through an Internet web site. The buyer will be able to view the schedule of multiple properties in their area giving them the ability to plan their house hunting expeditions. Sellers of real estate may block out times when they do not want their property shown directly from their own computers. Agents will have complete visibility of the seller's availability time thereby increasing availability to schedule. Sellers will also be able to view when agents have scheduled a showing for their property and gain access to historical records of their property showings. Agents will be able to list properties for showings and make appointments for their clients to view other agents' properties with a click of a mouse. The central scheduling focus will be around the property. The seller's agent along with the seller will set up pre-conditions allowing a buyer or buyer's agent to select times for showings around these pre-conditions.

DRAWINGS

Other objects and advantages of the invention will become more apparent upon perusal of the detailed description thereof and upon inspection of the drawings in which:

FIG. 5 is an example of the appearance of the agent browser display of a "Schedule Showing" view.

DETAILS OF INVENTION

Figure 2:
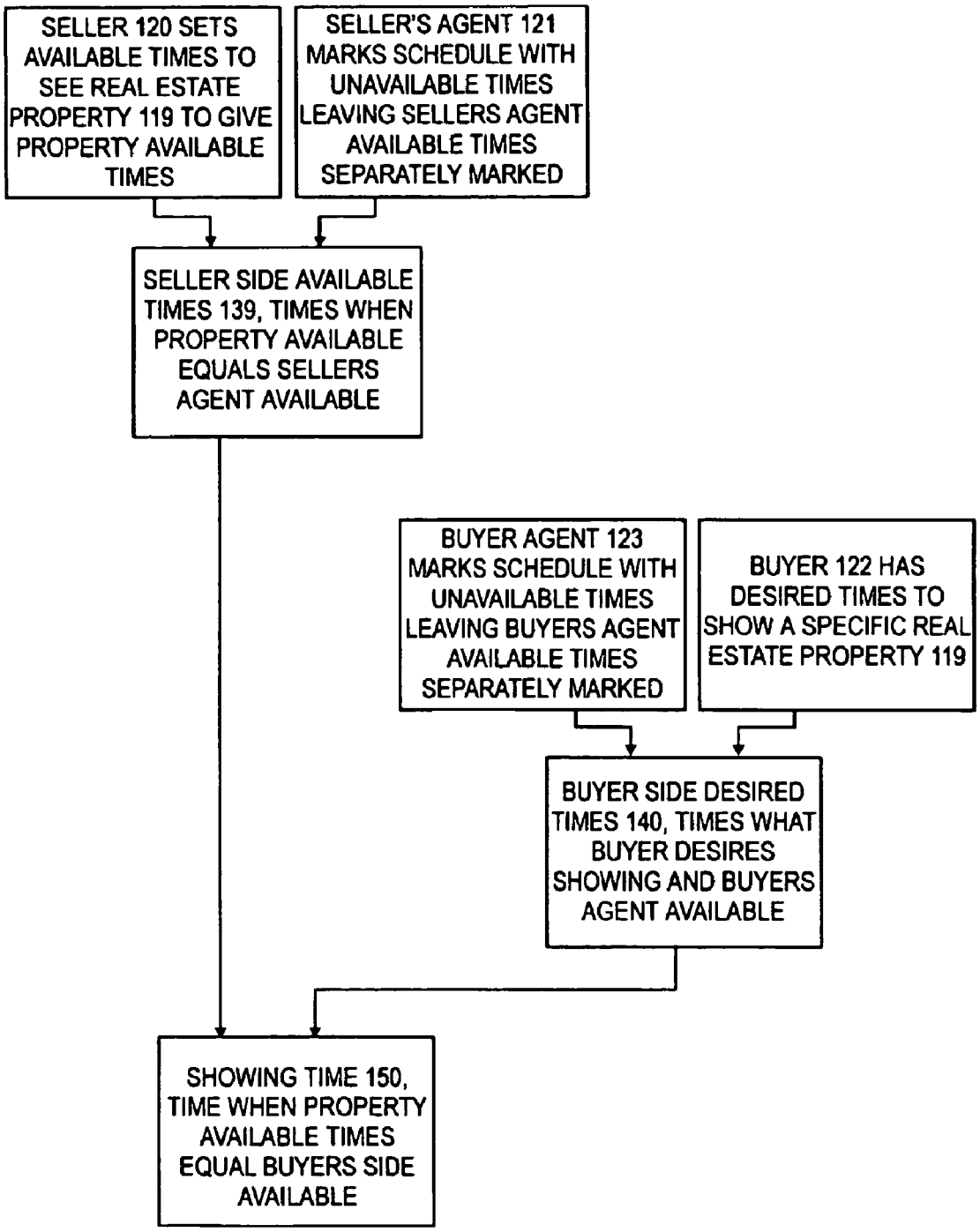
FIG. 2 is a flow chart of the relationships between the parties and entities involved in the process of this invention.

There are four [principle] *principal* parties or entities involved in the process of this invention with two [1] additional types of parties potentially being involved. There is at least one real estate property 119, a seller 120 of the real estate property 119, at least one potential buyer 122 of the property 119, and a seller's agent 121 for representing the seller 120 which includes showing the property 119 to potential buyers 122. The property 119, the seller 120 and the seller's agent 121 and any assistants [121A] of the seller's agent 121 may be referred to collectively as the seller's side [129]. There may be additional parties involved in the utilization of the property 119. There may be a buyer's agent 123 for representing the buyer. If there is a buyer's agent 123, then this buyer's agent 123 or an assistant of the buyer's agent [123A] must be present when the buyer 122 is shown the property 119. See FIG. 2. The buyer 122, the buyer's agent, and any buyer's agent assistants [123A] may be referred to collectively as the buyer side [130]. The seller side [129] may need to make the property 119 available for vendors [124] to perform services related to a sale or other transaction of the property 119. Some of these services include home inspections, maintenance people to correct items identified during home inspections, and photographs of the property 119. Additionally, the seller side [129] may schedule other appointments related to the property such as open houses, caravan showings, and brokers open houses. Either of the seller side [129] or the buyer side [130] may need to schedule appraisals of the property 119.

The process of this invention is novel in its ties to a particular real estate property 119 and the initial parallel logic sequences that determine a sub group of seller side 129 available times 139 and a corresponding sub group of buyer side 130 desired times 140. These determinations, as will be described, are performed in parallel. Then the outputs of the seller side available times [130] *139* are compared to buyer side desired times 140, with the result being a showing time 150 of the property 119.

Figure 1:
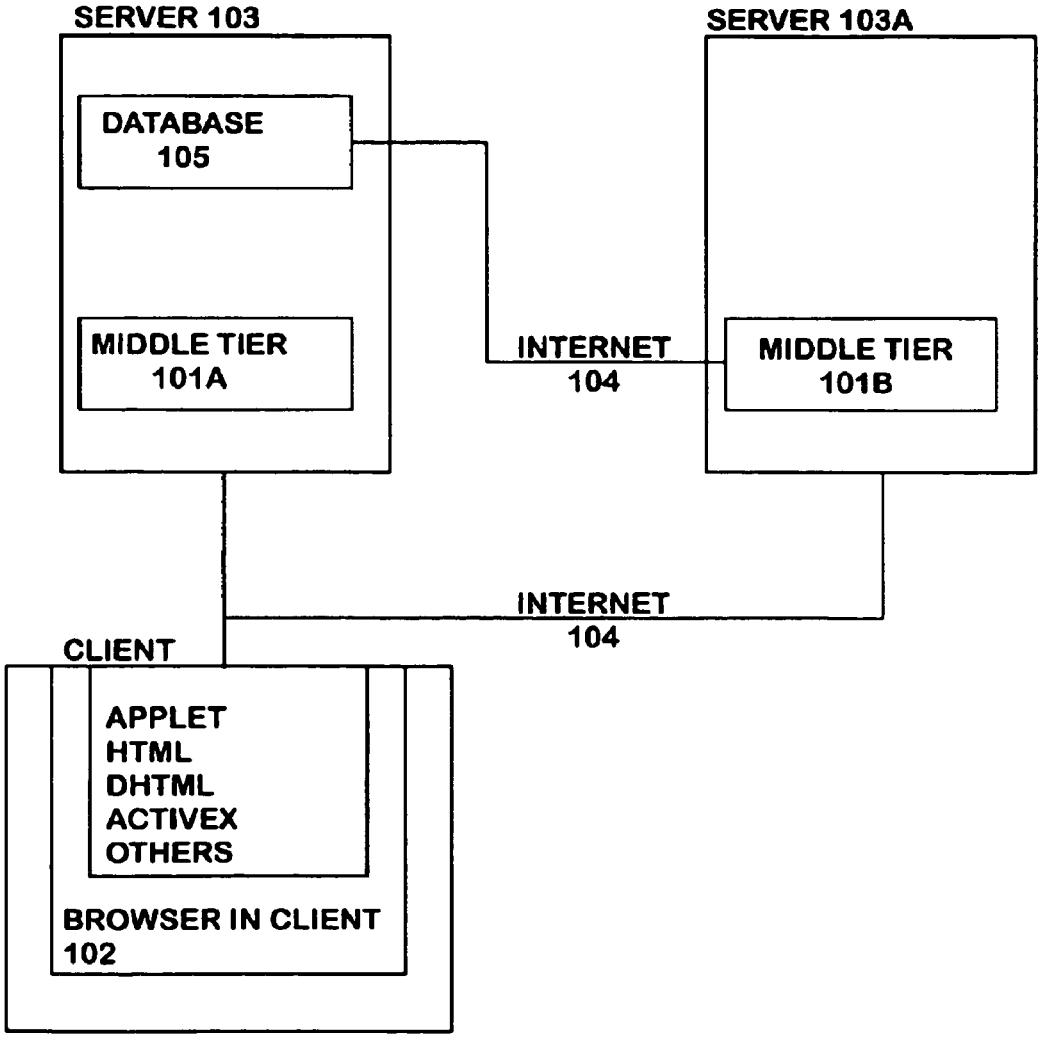
FIG. 1 is an overview of the relationships between the three tiers, the client, the middle tier, and the database used in a process performed in accordance with this invention.

FIG. 1 depicts an overview a data management system for performing the process of this invention. The figure depicts the relationships between three tiers, a client or clients, a middle tier *101A, 101B, sometimes herein referred to as middle tier* 101, and a database 105, and client browsers or computers 102 used in a process performed in accordance with this invention. The software maintains a database server 103 over the Internet 104 containing the database 105. All the scheduling is maintained at this central database 105. The database 105 is replicated both on site and off site in real time. There is also a separate provision to read from any of the databases 105. The database 105 and middle tier 101 are comprised of a computer useable medium having computer readable program means embodied in the medium for causing the process of scheduling the utilization of the property 119.

Because in software it is almost impossible to program a pure three tiered system, some of the routines, methods, or objects that are described as middle tier 101 functions may in fact be done in the database 105 on the server side or on the client or browser 102 in the client side.

Figure 10:
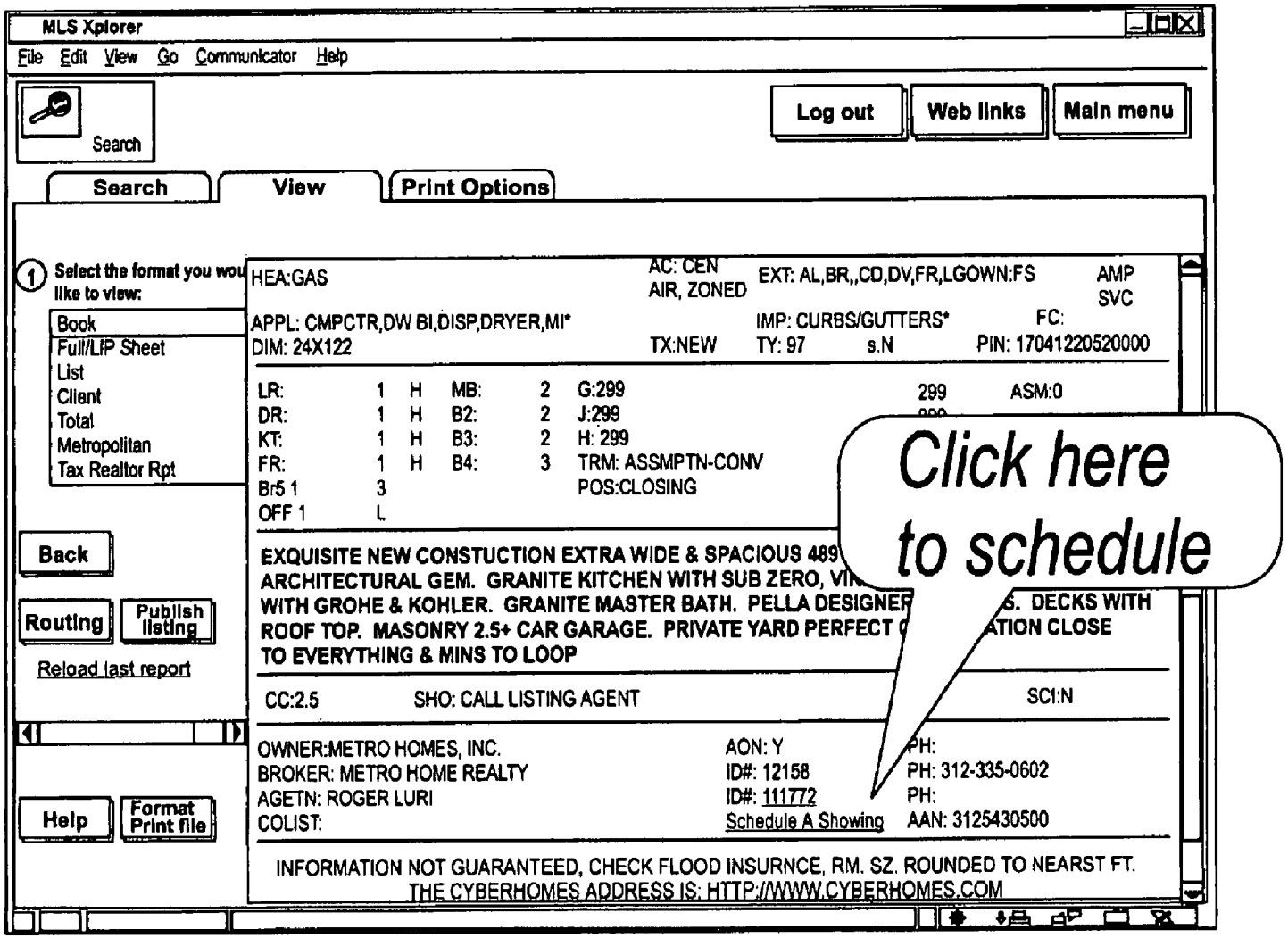
FIG. 10 is an example of the appearance of a Multiple Listing View with a link to a system made in accordance with this invention.

A second module in the components for performance of the process is the middle tier 101. This is the interface between a view *displayed by a browser* 102 and the database 105. [An example of view 102 is the browser 102 of FIG. 1.] Each [display] view *displayed by a browser* 102 calls the middle tier 101 depending on what is selected by the user. Each routine is a module that makes the decisions on how the data is written to the database 105 and what and how it is taken from the database 105 with hints on how the data is displayed in that particular view. This middle tier 101 is generally a third party program and currently can reside in the server (see middle tier 101) or reside in a separate computer (see middle tier 101B). Since it is a separate program, it can run on most operating systems. For example in one instance when the middle tier 101 is in the server 103 it is run on a Unix type environment using a Unix version, and in another instance if it is running on a Window's machine, it uses a Windows version. As stated, the middle tier 101 can be on another server 103A that communicates over the Internet 104 to the database server 103. The initial link to the middle tier 101 is usually a browser viewing a Multiple Listing *View* as shown in example in FIG. 10.

When the middle tiers 101A or 101B are on the server side most of the intelligence is done on the server 103. The client side will usually have intelligence to allow selections depending on the state of the selected item. This can be done as an applet in the browser, dynamic HTML, Active X, plain HTML, or other intelligence in the client side or browser.

The middle tier 101 is a portable component whether it is middle tier 101A, or 101B. When the middle tier 101 is on the server side the middle tier 101 can either be located on the same computer as the database server 103 (as in middle tier 101A) or on a separate computer 103A connected by a LAN, wan, or the Internet (as in middle tier 101B). This allows the database server 103 to concentrate its load on just processing the database 105, while the middle tier 101 can do intensive processing and data transfer. With this architecture the intensive processing of the middle tier 101 can be scaled by putting the middle tier 101B on multiple servers 103A that can communicate with a single database 105. These variations are all shown within FIG. 1 although they may be used individually or in some combination.

When the middle tier 101 is on the server side, the client can be a browser such as browser 102. The data from the middle tier 101 is then shipped off to the browser with generated HTML or the browser may have more intelligence such as, HTML with Java applets, dynamic HTML, Active X or other means of putting intelligence in the browser. The browser with extra intelligence makes the client more versatile by allowing the client to make decisions before making calls to the middle tier 101. The HTML version is faster and more universal and still gets the information across but has fewer cues for the user and may require more Internet accesses.

Views *provided by a browser* 102 consist of form components such as the text boxes, cells in a grid, check boxes, etc. The view *provided by a browser* 102 is where information translated and filtered from the database 105 through the middle tier 101 is displayed. The view *provided by a browser* 102 also stores non-displayable state information provided by the middle tier 101 so when an item is selected, the state is used to decide on what is to happen including what calls are made to the middle tier 101. The view *provided by a browser* 102 is used both for scheduling and for entering non-schedule data such as names, addresses, and contact information into the database 105. The schedule part of the view *provided by a browser* 102 is more placement or grid oriented while the non-schedule data are generally more text oriented. Some operations such as adding notes require both a text box for putting in the note and position for when the note is scheduled.

The software helps buyer agents 123 and seller agents 121 to manage their schedules and communication to other agents with respect to the properties that are listed to be shown. The seller [121] *120* is involved because there are times that they do not want the property 119 to be shown or want to see when their property 119 is being shown. The buyer 122 is involved because the showings are based on the buyer's availability to go to the properties or the buyer 122 desiring or wanting to see when a particular property is available to look at.

There are other schedule events related to a real estate transaction besides showing the property 119. Some tie up just the property 119, some tie up just the agent, and some tie up both the property 119 and the agent. The owner having a birthday party is an example of just the property 119 being tied up. An agent can be tied up showing another property or attending a meeting. Both the property 119 and the agent can be tied up in photo sessions, closings, and appraisals. The views have selection options such as pop-up menus for the user to select what type of event is being scheduled for the time period. The different events show up on the schedule and enable the user to understand how the time is being used. Vendors [124] are able to access as a client to either allow their time to be scheduled by sellers side [129] or buyers side [130] or some combination, or [Vendors 124] *vendors* may schedule their time themselves if necessary.

There are also two major scheduling models in real estate depending on the locality. One requires both the buyer agent and seller agent to be at the showing, the other only requires the buyer's agent 123 to be at the showing. The requirement that both the buyer agent 123 and the seller agent [122] *121* have to be at the site implies:

a. Buyer agent 123 is busy or showing—none of the other houses that the agent 123 represents can be shown unless transferred to an assistant 123A.
b. If the seller agent 121 is busy or showing—none of the other houses that the agent 121 represents can be shown unless transferred to an assistant 121A.
c. Property owner, *i.e. seller,* 120 can block out a time that the property 119 cannot be shown, *and* the seller agent 121 is still able to show other properties.

The second major scheduling model usually requiring a lock box requires only the buyer's agent 123 to be there. A buyer 122 cannot schedule the property 119 if the buyer agent is busy or the property 119 is busy. The seller agent 121 is free to show other properties even if one of the agent's properties is being shown.

There are three major perspectives for viewing the data. One is in respect to the property 119, a second is in respect to an agent, and third is in respect to a buyer 122. There are a variety of ways to display these to meet the needs of buyers 122, sellers 120, and agents. The following are example of views.

Agent sees his schedule. ("My Schedule"). Agent can schedule his or her time that is not related to a specific property 119 from this perspective. (such as meetings, personal, times not available). The agent can also schedule a showing to another property 119 from this view.

Agent sees his schedule from the perspective of each property listed by the agent. ("My Listing"). Agent can schedule property specific appointments from this perspective. The agent can schedule an appointment of the property with another agent from this view.

Agent sees the schedule of other properties ("Schedule Showings"). Agent can schedule their own or other properties from this perspective. This screen really does not do any more in function than what can be done in "My Schedule" and "My Listing" but the view displays it differently such as the ability to see and schedule more than one property at a time.

Buyer 122 can see the availability of when to schedule a property 119 and can schedule a showing. This is a similar view *provided by a browser* 102 as my listing but the buyers 122 do not necessarily get to see why the property 119 is busy, are limited on how they can schedule an appointment, and can do few if any other functions. The one exception of an appointment that the buyer 122 does get to see is an open house. This way the buyer 122 knows that they can visit the property 119 at those time periods without having to make an appointment. [Buyer's] *Buyer* 122 can in some embodiments schedule his or her unavailable for performing functions related to viewing, and purchasing the property 119. This will enable an agent such as the buyer's agent 123 or assistant [123A] to set up showings or property related appointments for the buyer 122.

Seller 120 can see when the property 119 is being shown and can block out time or cancel time slots when they do not want the property 119 to be shown. They in some cases have more detail than what the buyer 122 can see but less detail than the agent can see.

There are views to modify agent information, property information, and views for login. Additionally, there are views to notify agents of new appointments or cancellations and allowing the agent to acknowledge them.

As seen above, the various views *provided by a browser* 102 allow various levels of detail depending on the type of user. For instance, a buyer 122, seller 120, and seller agent [123] *121* essentially look at the same view [102] when looking at a specific property 119. The agent [123] *121* has the most control of what can be seen and what can be scheduled or cancelled, while the buyer 122 sees the least detail, only whether the property 119 is available to see and an open house, while [an owner] *a seller* 120 sees more detail. The buyer 122 can schedule and cancel, the seller 120 can block out times when the property 119 cannot be seen.

Views 102 can be daily, weekly, monthly, and combinations of the above views to overlay more information. The software in different versions allows access to many of the views 102. The views 102 are operated under particular logic rules.

1. In scheduling what shows when one clicks on or selects a grid depends on the state of the cell chosen and the time when it is clicked.
2. In some places some intelligence combined with the state, such as when time passes the view makes a time the previously was in the present or future a time in the past. Also using coordinates for travel time bases on the time of day (rush hour). The client can be extremely intelligent and calculate travel times.
3. What middle tier 101 calls to use when clicking on a grid—depending on the stare of the cell and how clicked.

The middle tier 101 operates as follows:

1. Takes the information from the grid, time, duration, agent, and property agent that the grid supplies and generates a query.
2. Gets the info from the query, prioritizes it for the view it was called from (the library call is limited to the view, if it is a different view it is a different library call.) Sends position (time slot) information, state information, display information (color, text, ToolTips, special boxes such as notes).

The middle tier 101 can reside in a separate computer or the database server 103 so depending where it is the view information is. The call is based on parameters on whether to send the highest priority or the list by priority for the time slot.

There are additional miscellaneous features.

1. Assistants—A scheduled event such as a showing can be transferred to an assistant so the property 119 is still busy. The assistant for this showing tied to the agent so the agent is aware that the assistant is taking care of the property at that time.
2. All views allow notes to be added so the agent and others can read information. There are levels that allow who can see the notes.
3. Others can be notified by electronic mail and other means such as voice mail, page, fax, pda (personal data assistant) insertions when appointments, cancellations, or changes are made by others that affect the agent. The receiving agent controls the notification so that he is in control of how he is notified.
4. Agents are allowed to communicate to other agents by clicking on the time slot, requesting to communicate, and inserting a message either by typing or inserting by pasting.
5. For each property the seller agent has a choice of allowing instant confirmation or requests based on the agent's response.
6. A change view pops up at login or when selected so the agent is notified of changes. In this view they can confirm requests so that the others know the appointment is confirmed.

There are critical tables in the database 105. These include:

1. Agent—this gives all the information about the agent such as names, addresses, contact numbers and preferences. Referred to by the agent id.
2. Property—this gives all the information about the property 119 including owner information, price, address, suggested showing time duration. This also contains a parameter on whether the seller agent is required to be present upon showing the property 119. Referred to by the property id.
3. Appointment—this includes the property id, buyer agent id, seller agent id, time and date of appointment, and duration of appointment, type of appointment, type of note, when the appointment was made and by id of who made appointment. Cancellation date and time and by whom. This also includes whether email, fax, voice mail, pda information, or other contact was made. It also has a field for acknowledged and by whom. It also has a notes id field. As the database expands, the fields of the table may be made smaller by relating the information to other tables.

Since it is a relational database other tables are used to support the above tables. Other tables are also used to support the business model such as permissions and how agents are allowed to use the system based on contracts.

Since this is typically a relational or object oriented database, the data structure can be changed or divided into different tables, and all that is required is changing the queries and how handled in the middle tier.

Figure 3:
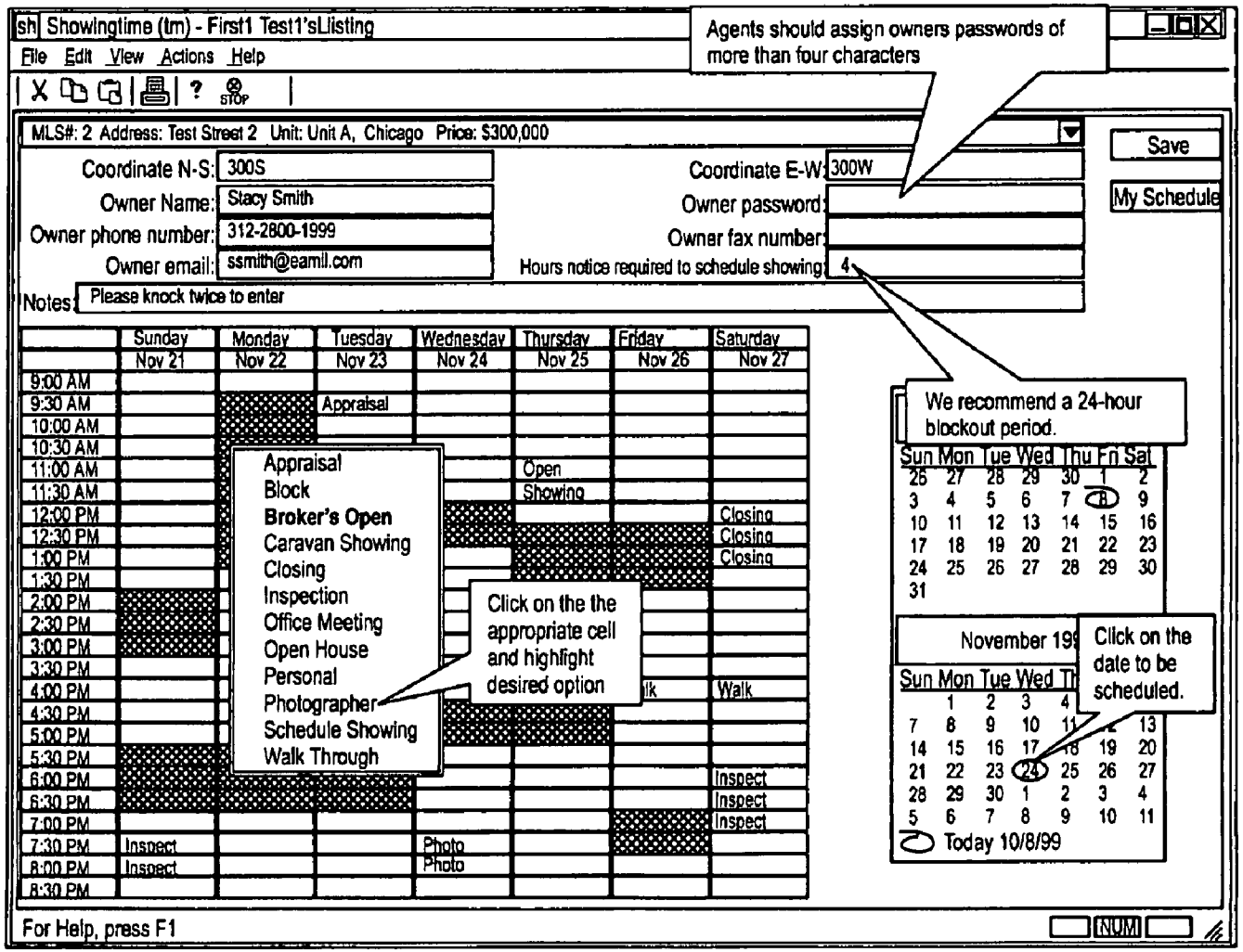
FIG. 3 is an example of the appearance of the agent browser display of a "My Listing" view.

The following are example flows of what different views do. A "My Listing" view displays a weeks schedule for a specific listing. See FIG. 3 for an example of what the appearance of the computer display of a "My Listing" view. The agent may state information for the view can be such as (a). an appointment can be made, (b). an appointment can be cancelled, (c) an appointment can be changed, (d). only notes can be changed, (e). an appointment of type property is busy (not a schedule, but property not available to show such as throwing a party). These states may be Boolean variations such as cannot instead of can, and may be combinations of OR'ed, and AND'ed together. (An example of an implementation where the appointment cannot be cancelled, is where the other agent is busy or showing another property, so the user cannot cancel another agent's appointment). This is where the agent can delineate the unavailable times as described earlier. As one example view a user of "My Listing" can do the following and although described as an agent, a buyer or seller can have permissions to also perform the following.

1. User chooses date from a calendar, and property from a combo box that list all the properties. Currently the user clicks a date on the calendar for the date and clicks on a property from the list of the combo box of the agent's listings to choose the listing to schedule or view the schedule. This method of choosing dates and properties can be easily changed or expanded by just adding options in the User Interface. If a date or property is not selected the previous date and property selected are used. If none have been selected before a default date and property is used (the default used now is the current date and the first property of the list). When a property is selected more detailed information about that property is shown and the user can also make changes to selected pieces of information and the view sends to a middle tier routine or object that modifies the database with the new information. Note that routine or object is used throughout the specification and claims in the alternative and the use of one of these terms does is the same as using the term 'routine or object'.
2. The view *provided by a browser* 102 calls the middle tier to query the database for the "My Listing" view. It gives the middle tier routine or object the agent, date, and property number to do the query on. The view *provided by a browser* 102 receives information to put into the schedule. The information includes, text, tool tips, notes, foreground color, background color, state information, and other miscellaneous information for each appointment time and date that is displayable on the view. The view *provided by a browser* 102 puts the information in the correct places based on the format of the view.
3. The user can now choose another property, date, leave the view, or choose a specific time to make or cancel an appointment. If a date or time is chosen then step 2, *as set forth in the preceding paragraph,* is repeated. Leaving the view hides or closes the view.

The following occurs when a time period is selected for an appointment. The time is parsed into one of three time periods, past, present but within time that notice is required (blockout time), and a future time after the time that notice is required (after blockout time). If the time is in the past or within the blockout time the user can only choose to show notes or a message or can request rather than confirm an appointment. If the time is during within the blockout time the popup menu also allows the user to schedule the property 119 as busy (owner throwing a party, etc) if of state (a) or cancel a property busy (owner throwing a party, etc.) if of state (e). If the grid is after the blockout time then the choices available are dependent on the state. For example if it is of state (a) then one set of choices are available. If it is a state that cannot be cancelled then no choices are available. If it is of state (d) only edit notes is available.

When a choice for a scheduled time and duration is made then a call to the middle tier is made depending on the choice of the menu. For instance if an edit note is chosen, then a routine to edit notes is chosen with the parameters of the login agent, the time and date slot that the note is for, what is in the note, and other information. If a "schedule showing" was chosen then a dialog asking for the other property would come up also allowing for notes and a "schedule showing" middle tier routine or object would be called again with parameters including the login agent, the other property, the time, date, and duration, a possible note, and other information. All the other choices would call other routines but include the enumeration of the choice in addition to the parameters such as the login agent, the time, date, and duration, a possible note, and other information.

The page with the login screen is a special case because all that is required is the agent ID and the password. The routines called may depend on how intelligent the client is. If the client is intelligent and the data persists as other views are called, then more information can be asked for and saved during login. For example if the client can store the information then during login a routine can be called to gather all the agent's properties information which can be used to fill a list box. If the client is very thin or less intelligent then a middle tier routine or object that calls for only agent information is called, and the agent's properties information is only gathered when it is needed in a different view.

Other views work on exactly the same principle as above. They have a place where they are displayed, the selections available depend on whether a schedule portion of the view is chosen or a section just to change information and preferences such as telephone numbers changes or preference changes. If a schedule selection is chosen the choices available are dependent on the time and state of the appointment selected and the middle tier routine or object called depends on menu selection chosen and its state.

Travel time determination between appointments can be done either in an intelligent client but would generally be done through the middle tier using the database and calling other programs. In a "schedule showing" view there is a display of multiple properties to schedule with each property's schedule for the day side by side. In this view the schedules for each of the properties are known and, "if the seller agent is required to be at the property", any period where the seller agent 121 is busy is also put into the view's schedule. With this information the [library] *middle tier* 101 or view *provided by a browser* 102 can see where each already scheduled appointment is located and use an algorithm or table provided to gray out a time depending on from where the agent last was and for each of the properties. This does not work as well in the "My Listing" view or the "My Schedule" view where the property 119 or other agent is chosen by a pop-up menu. This requires the travel time determination to be made after the property 119 or agent to schedule is selected and may require the scheduler to slightly adjust the time or duration of the schedule.

Query results are sent through the middle tier 101 which parses the results and decides how the data should appear in the view including schedules, colors, tool tips, notes, states, and special messages.

Since the middle tier 101 resides on the server side, the client calls the middle tier with parameters through the Internet 104 on a server 103. The middle tier then uses the parameters and generates a query that is sent over the Internet to the database 105 on another server 103A or the middle tier 101A could be on the same server 103 that the database 105 resides in. The query results are then sent back to the middle tier 101 and processed. The schedules, colors, tool tips, notes, states, and special messages are then sent back to the client over the Internet.

The middle tier 101 is the common area for the intelligent processing of the data selected in the view to turn it into a query to the database. On the return side the middle tier 101 is the intelligence that tells the view what to display in each of the schedule areas, and how to fill in the non-schedule portions such as property 119 and agent information.

The middle tier 101 is a set of different objects or routines with parameters passed for the variables such as agents, properties, times, and duration. The following are the example middle tier calls and an example flow of each of the calls. Other routines are combinations of the following routines or the same routines with filters to allow less detail to flow. For example, a buyers 122 screen is essentially the same as an agent's listing with most of the details blocked out. Encrypted passwords with changing keys are sent to the libraries 101 for security to protect the database. The following flows assume the real estate model that the selling agent is required to be at the property 119 (the parameter for the property is marked that agent must be present and the library accounts for this parameter). The case where the seller agent 121 is not required is a simplification and therefore not shown here.

The client, whoever the party is, may review the columns of the appointment table. Every appointment has space for a buyer agent id, a seller agent id, a property id, a time date duration, and type of appointment. Other fields of the table include reference to notes, and bookkeeping matters such as time and date appointment made, acknowledge flags, and other message flags.

Figure 4:
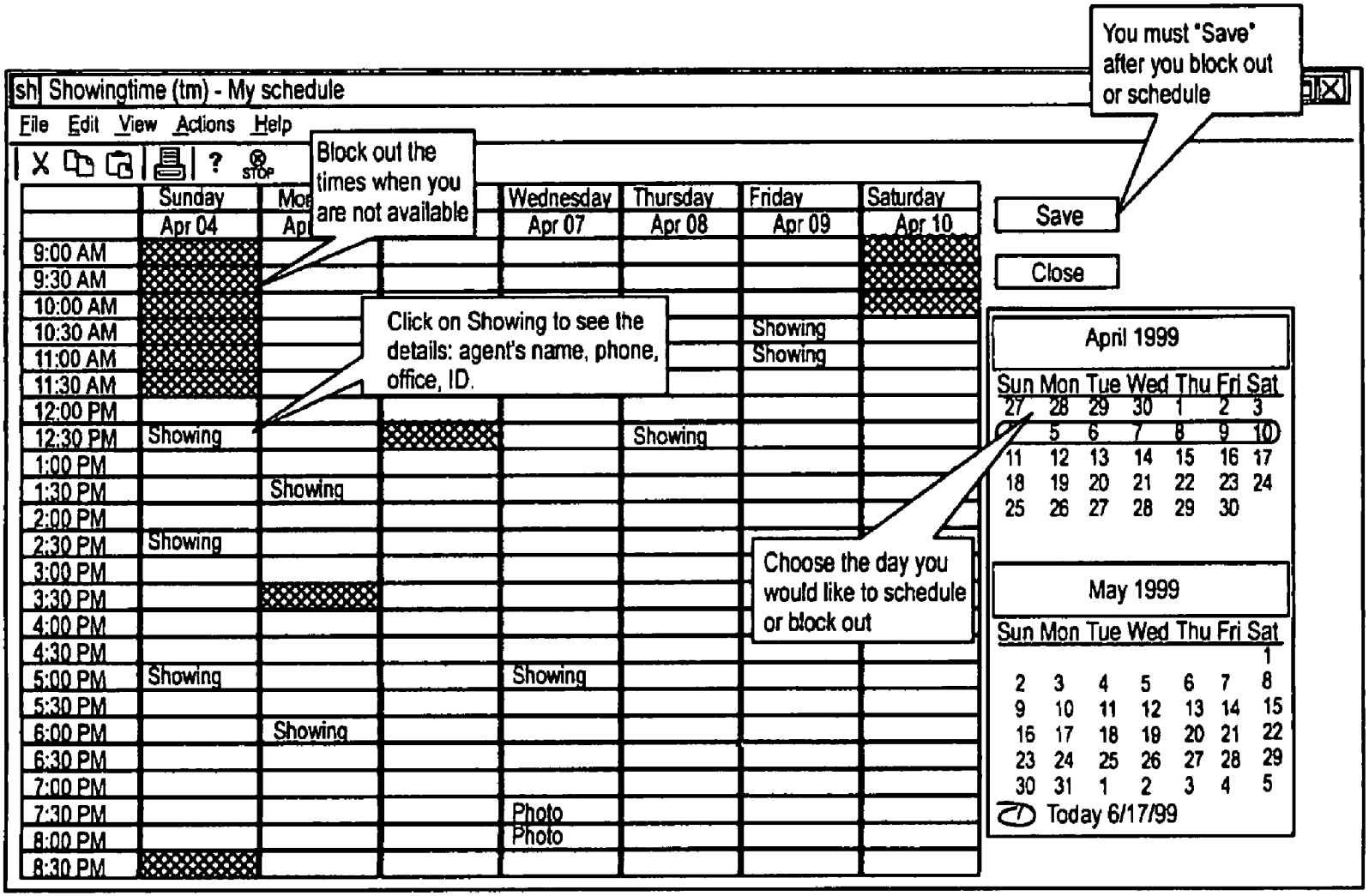
FIG. 4 is an example of the appearance of the agent browser display of a "My Schedule" view.
Figure 6:
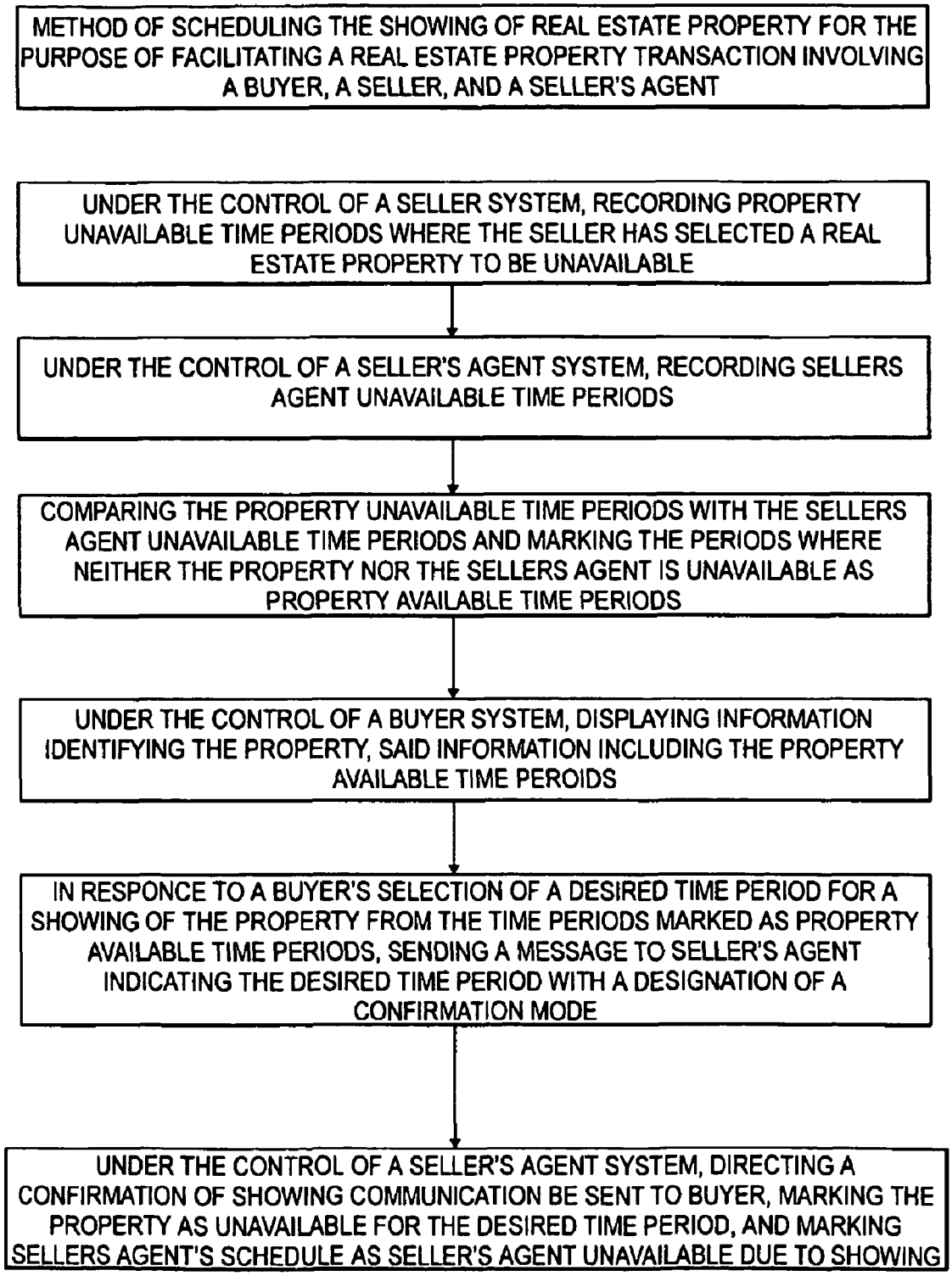
FIG. 6 is a flow chart showing a method for scheduling a real estate showing performed in accordance with this invention.
Figure 7:
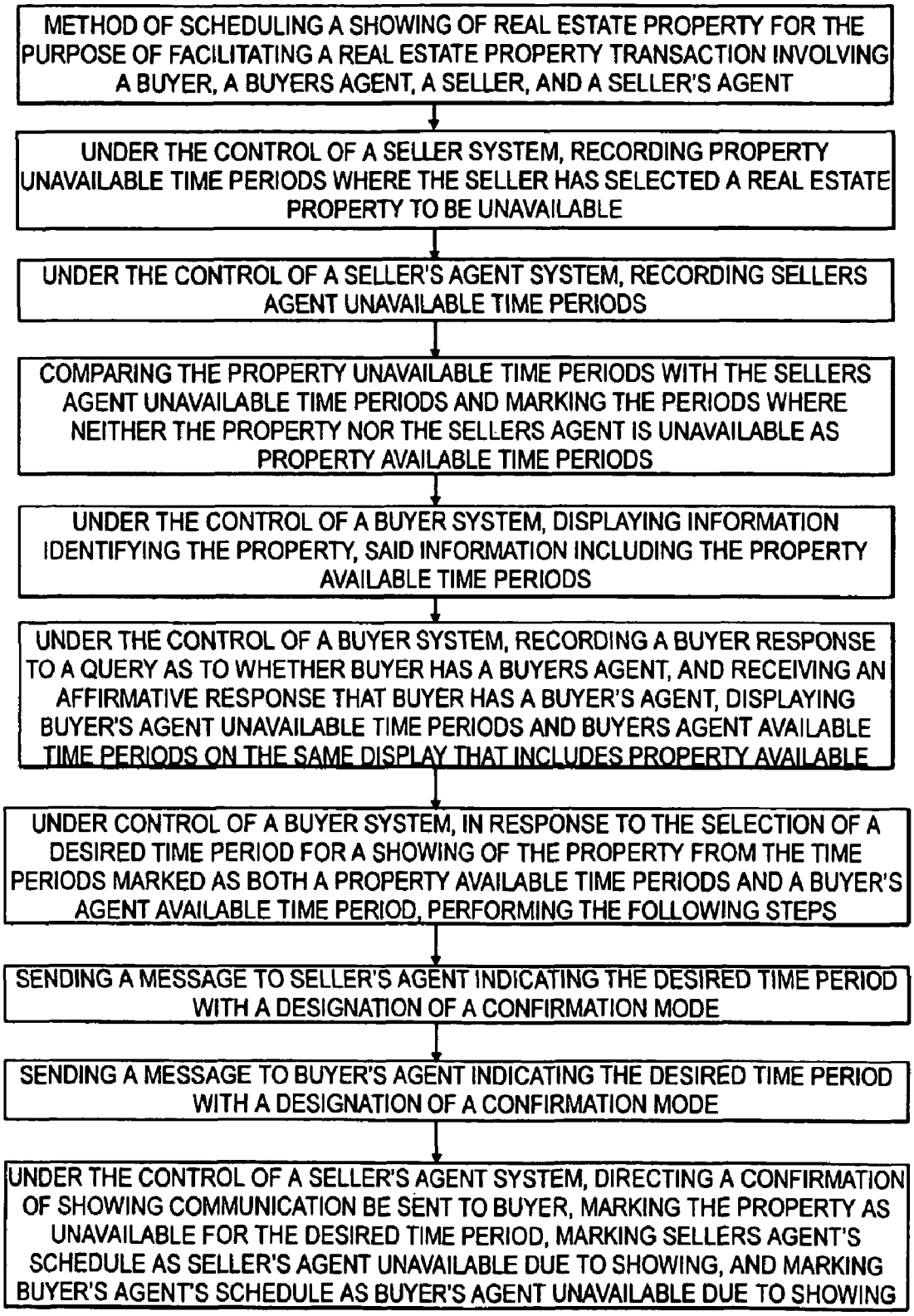
FIG. 7 is a second embodiment of a method for scheduling a real estate showing performed in accordance with this invention.
Figure 8:
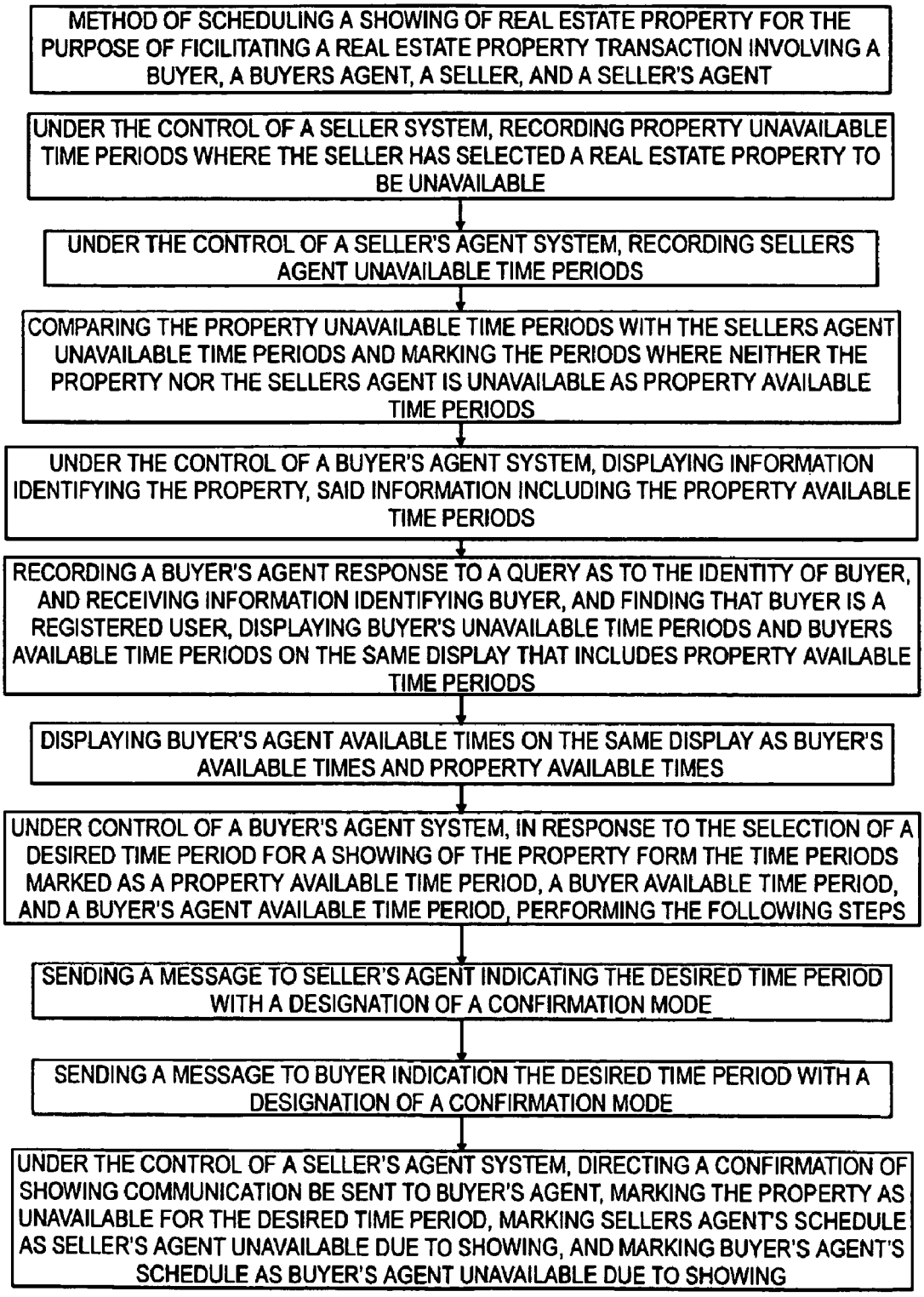
FIG. 8 is a third embodiment of a method for scheduling a real estate showing performed in accordance with this invention.
Figure 9:
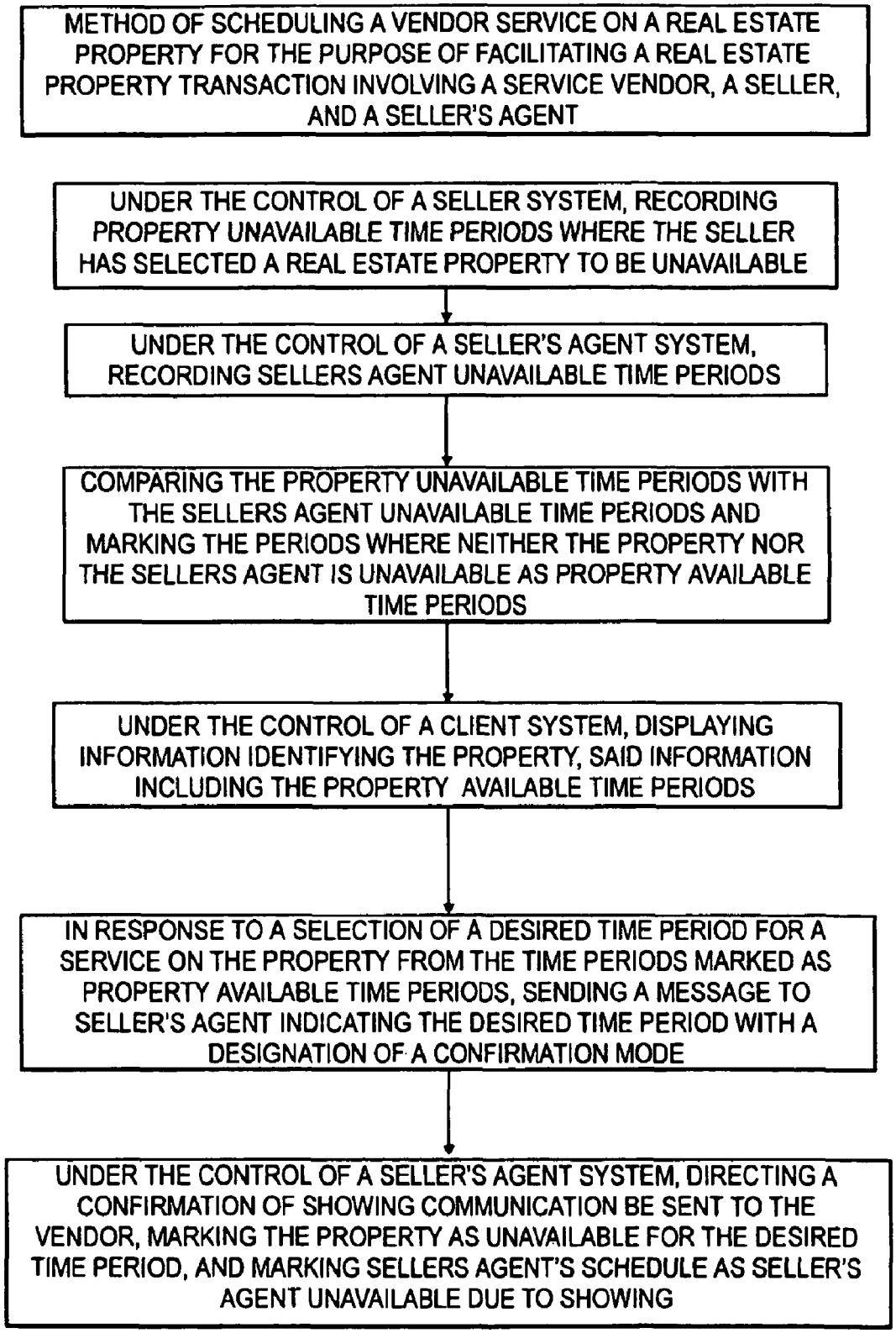
FIG. 9 is a method of scheduling a vendor service on a real estate property performed in accordance with this invention.

There is a simple example to get information for "My Schedule" (a weekly view), as shown in FIG. 4. My Schedule is the most straightforward because it just checks to see if the party is busy. Parameters sent in this routine are agent id and date. In one embodiment, the buyer may also have a "My Schedule" view or routine describing his or her schedule in regards to real estate shopping. The middle tier 101 then calculates the first day of the week, and does a query to the database for the period of time from the beginning of the week to the end of the week. It looks at the schedule table or tables and searches for all entries that include the agent id as a buyer's agent 123 or the agent id as the seller's agent 121 or the buyer's id. Since it is a relational database it gets the other agent and property information during the query. When it gets the information back from the database it must check the data for each time slot. This is the easiest to analyze because if an agent is busy the agent cannot be doing something else. Each category below is essentially a case statement where it puts specific variables into the text, foreground color, background color, tool tip, note and state of the time period (for the view to know what to do when selected). The categories are:

a. It is a property schedule and it is this agent is the seller agent.
b. It is a property schedule and the agent is the buyer's agent.
c. It is an appointment type that is not property related but keeps the agent busy.
d. A property is not available to show—this is totally ignored.
e. Checks for notes not related to a specific property.

For cases a or b the [library] *middle tier* 101 then assigns a text, foreground color, background color, a tag for a tool tip, a tag for a note, and a state that are appropriate for that type. Usually the tool tip gives property and other agent's information if it is a property schedule.

For the case c the [library] *middle tier* 101 uses an additional case statement which is used to determine the same as above depending on the appointment type.

This information is passed to the view as parameters or containers. If the client is HTML or there is intelligence in the browser such as a Java applet or DHTML, the parameters are sent to a generator to generate the HTML tables or the applets. There are middle tier methods to get information for "My Listing" (a weekly view) with a simple example as follows. This is a little more complicated than "My Schedule" because the view attaches the agent to a specific property and yet must also show that an agent is busy at another property. Parameters passed to the middle tier 101 for this routine would be login agent id, MLS (multi-listing) id of the property, and the date. Among the calculations and processing are to get the first day of the week from the date. It looks at the schedule table or tables and searches for all entries that include the agent id as a buyer's agent 123 or the agent id as the seller's agent 121 or the property id as the id of the property selected. When it gets the information back from the database it must check the data for each time slot and categorizes each time period in the following order and gives it a priority where a is the highest.

a. Checks to see if it is a property connected appointment and connected to this particular property. (A non-property related appointment is an agent at a meeting, not available, etc. A property-connected appointment is a showing, a photo session, an appraisal, etc.).
b. Checks to see if the login agent is showing this property.
c. Checks to see if the login agent is showing another property.

d. Checks to see if the login agent is busy or has other types of appointments connected with other properties.

e. Checks for just notes related to the property but nothing else.

Again each of the categories put in variables for text, foreground color, background color, a tag for a tool tip, a tag for a note, and a state that are appropriate for that type. Category d has an additional case like statement to determine what to put in based on appointment type. The information is returned to the view in the same manner as 1) above.

There is a Middle tier routine to get information for a "Schedule Showing" view (a daily view but multiple properties) as follows. The "Schedule Showing" view is a compound view of "My Schedule" and many property listings ("My Listing"). Because it is a compound view, it is a little more complicated because it contains multiple queries. The middle tier 101 also has to prioritize each property column separately to relate to that property. See FIG. 5 for the "Schedule Showing" view.

There is a Middle tier routine to get personal information of an agent as follows. This is a simple query to get the agent information when you know the agent id. The agent information is gotten directly from the agent table or other tables with relationships to the agent table. The query is parsed and sent back to the view.

There is also a Middle tier routine to get property information. This is almost exactly like getting the information from the agent, but use property tables with the property id.

The following routines write to the database 105. When these routines write to the database 105, they can also write to a change table that is used by a separate process to send messages such as emails. The change table is also used to pop up at login so the agent is aware of changes made to the schedule.

Middle tier routines to schedule an appointment are straightforward. They need to be transaction oriented. The database 105 needs to be sure another party did not make another appointment after the latest query of the schedule to the database. The view would not know that the schedule was already made. If the first part of the transaction shows another scheduled the time, the appointment is not made and an error for the particular appointment is sent to the view to warn the user that the appointment was not made.

If the time is free the middle tier routine puts the buyer agent id, the seller agent id the property id, the appointment type, schedule time and duration, when the appointment is made, directly into the schedule table. The type of appointment determines whether the login agent is put into the buyer agent or seller agent field. In addition, the call by the view helps the middle tier routine determine whether it needs to enter a property id or the other agent into the other agent field. As described above, the logic involves a computation of the vendor or buyer side desired time 140 and the seller side available time 139. The view further compares the buyer side desired time 140 with the seller side available time 139 to calculate a showing time 150.

There are Routines that put in acknowledgments of appointments. The changes again are simple queries to the appointment table and the list of changes schedule.

There are Routines to cancel an appointment. Cancelled appointments need not be deleted; they are marked in a special field of the appointment table and ignored by the queries. This is useful for histories.

Some of the compound views work better with a little bit of extra intelligence. A good example is if you have a "schedule showing" with multiple properties in the view. The views allow you to mark multiple appointments before sending them to the database. The state of the time period from the middle tier 101 is only helpful for interactive Internet calls. If the agent marks a time, then an intelligent view will not allow the user to mark another property in the same time period before the save to the Internet.

For efficiency multiple queries are packed into a single Internet call and parsed on the other end. This saves time when making multiple appointments and in complicated queries for some of the compound views. Stored procedures in the database also help.

There are provisions built in for the client to request a scheduled time even when an appointment is less than the time of notice required or for many cases when an appointment may not be available. These special cases flag that the client made a request for an appointment but is aware that the appointment is technically not available. The person who the request was made then has the option to confirm or reject the appointment.

An extensive call center technology providing access to the same information seen by agents, buyers, and sellers is provided to allow either a centralized call center or the brokerage's own front desk to handle inbound and outbound calls required for this service.

Agents and brokerages have access to reports presenting several different metrics of performance of the system as well as providing agents with the capability to provide information to their listing clients.

In some cases the seller themselves acts as their own agent in a transaction form known in the industry as "for sale by owner". In this case, the technology described herein allows the seller to be the selling agent.

While the invention has been described and illustrated, this description is by way of example only. Additional advantages will occur readily to those skilled in the art, who may make changes without departing from the true spirit and scope of the invention. Therefore, the invention is not limited to the specific details, representative devices, and illustrated examples in this description.

We claim:

1. A data management system for scheduling appointments at a real estate property through client browsers, comprising:

a database server;

a middle tier;

said database server for communication with the client browsers through said middle tier;

said middle tier programmed for routines to manage scheduling of utilization of the property related to a real estate transaction;

said middle tier programmed routines including steps for transmitting communications to provide a user of [the] *a first* client browser with a view of the availability of the property for an appointment related to a real estate transaction upon the browser selecting the property;

said middle tier programmed routines including steps for receiving, storing data on, and responding to a request from the user of the *first* client browser for an appointment at the property at a desired time;

said middle tier programmed routines including steps for receiving and storing property available and unavailable times for appointments at the property from a seller of the property using a second client browser;

said middle tier programmed routines including steps for receiving and storing certain time periods as available and unavailable as far as an agent's availability for appointments from the agent [user] using a third client browser;

said middle tier programmed routines including steps for displaying the agent availability to a client user viewing property availability for scheduling an appointment;

said middle tier programmed routines including steps for communicating information for an agent user to view the agent [users] *user's* schedule including entries related to properties including the property and to other agent user appointments not related to properties;

said middle tier programmed routines including steps for communicating information for [an] *the* agent user to view availability and unavailability of the agent [users] *user's* listed real estate properties;

said middle tier operating under a scheduling model requiring both a buyer agent and a seller agent to simultaneously be at showing appointments at the property;

said middle tier having a programmed logic rule that if a buyer agent is busy or showing, none of the other properties that the buyer agent represents can be shown unless transferred to an assistant of buyer;

said middle tier having a programmed logic rule that if a seller agent is busy or showing, none of the other properties that the seller agent represents can be shown unless transferred to an assistant of seller; and said middle tier having a programmed logic rule that an owner of the property [owner] can block out a time that the property is unavailable, *and* the seller agent is still able to show other properties.

* * * * *